US006199434B1

(12) United States Patent
Cornil et al.

(10) Patent No.: US 6,199,434 B1
(45) Date of Patent: Mar. 13, 2001

(54) COMPACT DEVICE FOR METERING GAS AT VARIABLE PRESSURE

(75) Inventors: Jean-Philippe Cornil, Houilles; Dominique Dutertre; Laurent Mode, both of Paris; Vincent De Laharpe, Chaville, all of (FR)

(73) Assignee: Gaz de France (FR)

( * ) Notice: Subject to any disclaimer, the term of this patent is extended or adjusted under 35 U.S.C. 154(b) by 0 days.

(21) Appl. No.: 09/082,226

(22) Filed: May 20, 1998

(30) Foreign Application Priority Data

May 23, 1997 (FR) .................................................. 97 06297

(51) Int. Cl.[7] ....................................................... G01F 1/10
(52) U.S. Cl. .......................................... 73/861.83; 73/195
(58) Field of Search ............................... 73/861.22, 195, 73/199, 198, 861.79, 861.83

(56) References Cited

U.S. PATENT DOCUMENTS

| 4,270,577 | 6/1981 | Brown et al. |
| 4,397,192 | * 8/1983 | Mollet ............................... 73/861.22 |
| 4,966,307 | * 10/1990 | Cornil .................................... 73/199 |
| 5,363,699 | 11/1994 | McCall . |
| 5,596,152 | * 1/1997 | Bergervoet et al. .............. 73/861.83 |

FOREIGN PATENT DOCUMENTS

| 0038258 | 4/1981 | (EP) . |
| 0337887 | 4/1989 | (EP) . |
| 2717536 | 3/1995 | (FR) . |

* cited by examiner

Primary Examiner—Harshad Patel
(74) Attorney, Agent, or Firm—Ostrolenk, Faber, Gerb & Soffen, LLP

(57) ABSTRACT

The device for metering the volume of gas flowing in a pipe, downstream from an expander-regulator, comprises in succession a flow straightener, a velocity-measuring flowmeter, and a silent flowrate limiter. The straightener comprises a support ring in which there are mounted a first perforated plate having holes distributed over its surface, together with a first porous plate and a spacer in the form of an annulus co-operating with the first perforated plate. The limiter comprises an upstream web defining a second perforated plate perforated by a defined number of calibrated holes, the total flow section thereof being much less than the total flow section of the first perforated plate, a second perforated plate, and a downstream web defining a third perforated plate having holes of total flow section that is much greater than the total flow section of the second perforated plate of the upstream web.

28 Claims, 10 Drawing Sheets

COMPACT DEVICE FOR METERING GAS AT VARIABLE PRESSURE

FIELD OF THE INVENTION

The present invention relates to a compact variable-pressure gas metering device for metering a volume of gas flowing along a pipe, downstream from an expander-regulator, and comprising in succession a flow straightener, a velocity-measuring flowmeter, and a silent flowrate limiter.

The invention relates more particularly to a device applicable to a gas distribution station performing the functions of expanding and regulating the delivery pressure of gas and of metering the volumes of gas delivered.

BACKGROUND OF THE INVENTION

In a conventional solution, as shown in FIG. 2, the gas flowing in a pipe 6A at an upstream pressure Pe is expanded from the upstream pressure Pe to a regulated downstream pressure Pa in an expander-regulator 1A which receives a control signal via a line 4A starting from a segment of pipe 3A situated downstream from the expander-regulator 1A. A meter 2A is disposed between pipe segment 3A and a downstream distribution pipe 7A. The meter 2A meters the volume of gas consumed at the downstream pressure Pa, which pressure depends only on the fixed set point of the regulator 1A that serves to keep said downstream pressure constant. To ensure that the metering is reliable, it is necessary to have good flow conditions in the pipe segment 3A between the expander-regulator 1A and the meter 2A. For this purpose, the segment of pipe 3A must comprise substantial rectilinear lengths L. The high level of disturbance that exists in the vicinity of the release valve of the pressure regulator leads to the gas flowmeter device being placed at a distance from the expander-regulator that corresponds to several times the diameter of the pipe interconnecting these two elements. This gives rise to non-negligible bulk.

In another known solution, as shown in FIG. 3, a gas meter 2B is installed upstream from an expander-regulator 1B, which is provided with a link 4B coming from the downstream pipe 7B to receive information concerning the regulated downstream pressure Pa. Under such circumstances, pipe segment 5B between the meter 2B and the expander-regulator 1B can be relatively short and the maximum flow rating of the meter 2B can be small. In this solution, the meter is not subjected to the disturbances generated by the expander-regulator.

However in solution A (metering downstream from expansion) as in solution B (metering upstream from expansion), the link pipes connecting the inlet of the station or the pressure expander-regulator to the meter, e.g. a spinner meter, generally adds additional disturbances due to the particular shape of the link pipes and to the accessories that may be mounted on the link pipes. The flowmeter can thus receive a flow of gas whose velocity profile is deformed or which has a gas stream that is subject to rotation, which is prejudicial to the quality of metering. In addition, the operating dynamic range of stations fitted in those manners, i.e. the ratio between the maximum flow rate Qmax and the minimum flow Qmin between which compliance with legal weights-and-measures regulations guarantees good metering accuracy at low pressure, is of the order of 20 to 30 for volume-measuring meters. Such dynamic ranges are sometimes too small to cover all of the flow rates applicable to certain public distribution stations, or certain industrial customers. This leads to low flow rates being metered poorly. Furthermore, the rules governing dimensioning of delivery stations generally lead to expander-regulators being installed that are of a capacity that is very much greater than that of the meters, under normal operating conditions. Consequently, in certain situations, there is a risk of the meter being damaged by its maximum flow rate being temporarily exceeded.

Proposals have also been made, in particular in document EP-A-0 337 887, for a multifunction integrated expansion station for feeding gas to a secondary network. In that case, the expander-regulator 1C, a straightener element 8C, a meter 2C, and a flowrate limiter 9C (FIG. 4) are all incorporated in a single outer body extending over a distance 5C and connected firstly to an upstream pipe 6C in which there obtains an upstream pressure Pe, and secondly to a downstream pipe 7C in which there obtains a regulated downstream pressure Pa. The link 4C enables a control signal to be applied to the expander-regulator 1C representing the downstream pressure Pa. Metering is performed at a variable metering pressure Pv which differs from the regulated downstream pressure, given the presence of the flowrate limiter 9C which develops headloss. This leads to the dynamic range of the meter 2C being increased, while also protecting the meter against possible excess flowrate.

A variable pressure meter of that type is advantageous because of the increase in dynamic range that it makes possible and because of its compactness. Nevertheless, it must be specially designed since the various elements of the expansion station must be integrated in a common housing. This leads in particular to a special and relatively complex design for the flow straightener 8C and the limiter 9C, in particular.

OBJECTS AND SUMMARY OF THE INVENTION

The present invention seeks to remedy the above-mentioned drawbacks and to make it possible to implement a gas distribution station and a gas metering device which are compact while also being modular, suitable for easily incorporating conventional expander-regulators or conventional meters, and implementing gas flow straightener elements or flowrate limiters of a structure that simplifies manufacture while guaranteeing robustness and a high level of safety in operation.

These objects are achieved by a compact variable-pressure gas metering device for metering a volume of gas flowing along a pipe, downstream from an expander-regulator, and comprising in succession: a flow straightener, a velocity-measuring flowmeter, and a silent flowrate limiter; wherein the straightener is disposed between a flange of an upstream pipe for coupling to the expander-regulator, and an upstream flange of the meter, wherein the limiter is disposed between a downstream flange of the meter or of an extender associated with the meter, and a flange of a downstream pipe, wherein the straightener comprises a support ring in which there are mounted a first perforated plate perforated by holes together with a first porous plate and a spacer in the form of an annulus co-operating with the first perforated plate, and wherein the limiter comprises an upstream web defining a second perforated plate perforated by a defined number of calibrated holes of total flow section that is much less than the flow section of the first perforated plate, a second porous plate, and a downstream web defining a third perforated plate perforated by holes of total flow section that is much greater than the total flow section of the second perforated plate of the upstream web.

Advantageously, the holes of the first perforated plate are distributed uniformly over the entire area of said first plate.

According to a particular characteristic of the straightener, the support ring has, in the vicinity of its downstream face, a shoulder projecting radially inwards from the support ring, and the first perforated plate is placed directly in contact with said shoulder.

In which case, advantageously, the first perforated plate, the first porous plate, and the spacer constitute a stack coming into abutment against the shoulder of the support ring, and the sum of the thicknesses in the axial direction of the first perforated plate, of the first porous plate, and of the spacer is slightly greater than the distance in the axial direction between the downstream shoulder of the support ring and the upstream face of said support ring in such a manner that clamping the stack between the flange of the upstream connection pipe and the upstream flange of the meter compresses the first porous plate to a small extent. As a result, any possibility of slack between the various elements of the stack is eliminated.

In one possible embodiment, the first porous plate is disposed directly against the first perforated plate and the spacer in the form of an annulus is disposed upstream from the first porous plate.

In another possible embodiment, the spacer is disposed directly against the first perforated plate and the first porous plate is disposed upstream from the spacer.

In another possible embodiment, the first plate, which is perforated by holes that are uniformly distributed over the entire area of said first plate, is constituted by the central portion of an upstream web whose peripheral portion defines firstly the spacer and secondly an upstream portion of the support ring, the first porous plate is held pressed by the spacer against a fourth perforated plate perforated by holes of individual section greater than that of the holes in the first perforated plate and of total through section that is much greater than the total through section of the first perforated plate, and the fourth perforated plate is constituted by the central portion of a downstream web whose peripheral portion defines a downstream portion of the support ring.

According to another characteristic of the invention, the upstream web of the limiter defines on its downstream face a spacer annulus which co-operates with the downstream web of the limiter to hold the second porous plate without clearance pressed against the third perforated plate of the downstream web.

Preferably, an empty space is provided between the second perforated plate and the second porous plate and has, in the axial direction, a thickness that is about twice the diameter d of the calibrated holes in the second perforated plate of the upstream web.

The presence of an empty space between the second perforated plate and the second porous plate provides better control over the flow coefficient of the limiter in that under critical conditions the porous plate does not disturb the establishment of the sonic throat at each hole. Experiments have shown that such a sonic throat can become established, when cylindrical orifices are used, at the outlet from the orifice, in the narrowest portion of the gas stream (vena contracta) at a distance of the same order as the diameter of the hole. The porous body then comes downstream to attenuate the noise generated by the shockwaves due to the gas being recompressed and due to turbulence.

Advantageously, the straightener has thickness in the axial direction that is about one-third the nominal diameter D of the pipe.

Similarly, the limiter has thickness in the axial direction of about one-third the nominal diameter D of the pipe.

The first and second porous plates are of a thickness lying in the range 5 mm to 20 mm, and preferably in the vicinity of 10 mm.

Advantageously, the first and second porous plates are constituted by a highly aerated nickel-chromium foam of density of about 0.6 g/cm$^3$, in which the ratio of solid volume over total volume is of the order of 6%.

According to a particular characteristic of the invention, the number n of calibrated holes in the second perforated plate is determined to be close to the value of the ratio Q/q between the overall flow coefficient Q of the limiter which is less than or equal to the nominal flow rate of the meter and the flow coefficient q of a calibrated hole, which is given by the formula:

$$q = KS\sqrt{TcP_0/2\rho_0 T_0}$$

where S is the section of a calibrated hole, K is a coefficient which depends on the shape of the hole, Tc is the temperature upstream from the limiter, and $P_0$, $T_0$, and $\rho_0$ are normal conditions of pressure, temperature, and density for the gas under consideration.

Preferably, the holes of the first perforated plate have a diameter lying in the range 1/30th to 1/6th of the nominal diameter of the pipe.

Preferred embodiments of the perforated plates are given below:

The first perforated plate has 25 to 335 holes distributed over four to ten concentric rings. The holes may be of different diameters from one ring to another. Nevertheless, in a simplified embodiment, the holes in the first perforated plate are all identical in diameter.

The second perforated plate of the upstream web has 8 to 100 calibrated holes distributed uniformly over three to six concentric rings. The calibrated holes through the second perforated plate are preferably all of the same diameter.

The third perforated plate of the downstream web has 20 to 40 holes distributed uniformly over two to four concentric rings. Nevertheless, it will be observed that the essential role of the third perforated plate is to support the second porous plate without disturbing the flow while still being capable, in the event of said plate accidentally becoming clogged, of accommodating the forces due to the upstream to downstream pressure difference. The main characteristic of the third perforated plate thus remains the total through area for the gas being large compared with that of the upstream web.

The second and third perforated plates have at least one central hole.

According to a particular characteristic, some of the calibrated holes of the second perforated plate are closed in selective manner by screws so as to match the overall flow coefficient Q to the rating of the meter as a function of the density of the gas.

BRIEF DESCRIPTION OF THE DRAWINGS

Other characteristics and advantages of the invention appear from the following description of particular embodiments given as examples, and with reference to the accompanying drawings, in which.

MORE DETAILED DESCRIPTION

Figure 4:
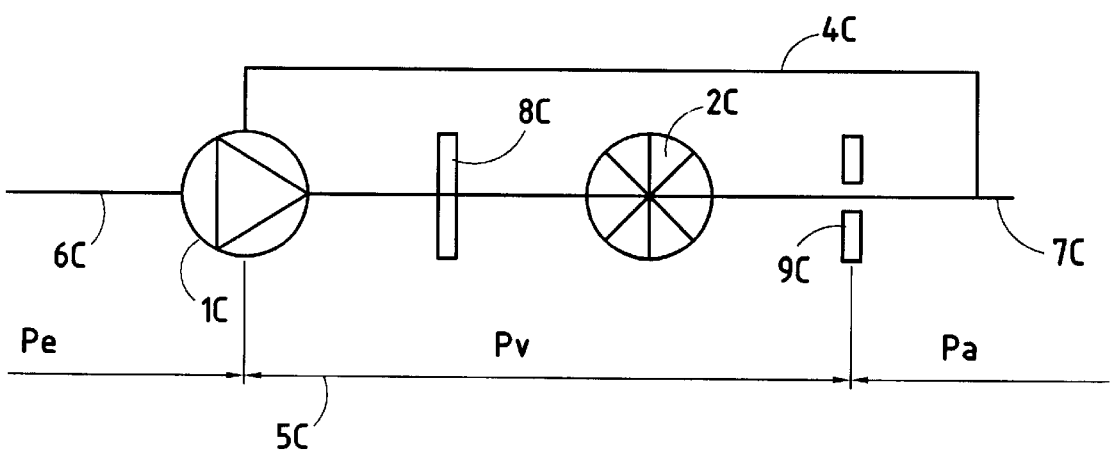
FIG. 4 is a theoretical diagram of a prior art multifunction integrated gas expansion station applying the principle of variable-pressure metering.

The variable pressure gas metering device of the invention relies on the operating principle shown with reference to FIG. 4, however it includes a set of modular subassemblies which are not incorporated in a common housing, unlike the embodiments described in document EP-A-0 337 887. In addition, the configuration of the module constituting the straightener and that of the module constituting the flowrate limiter, as described below, are adapted to facilitate implementation and to ensure high reliability in operation.

For a variable pressure metering device, the value of the overall flow rate coefficient Q of the limiter is less than or equal to the maximum flow rate of the meter so that regardless of operating conditions, it is never subjected to a flow greater than its capacity. Thus, the speed of the gas through the meter does not exceed the nominal maximum value corresponding to the nominal flow rate of the meter. The pressure Pv at the meter can thus vary between the delivery pressure Pa downstream to a pressure that is close to the upstream pressure Pe, as a function of the flow through the station.

Figure 5:
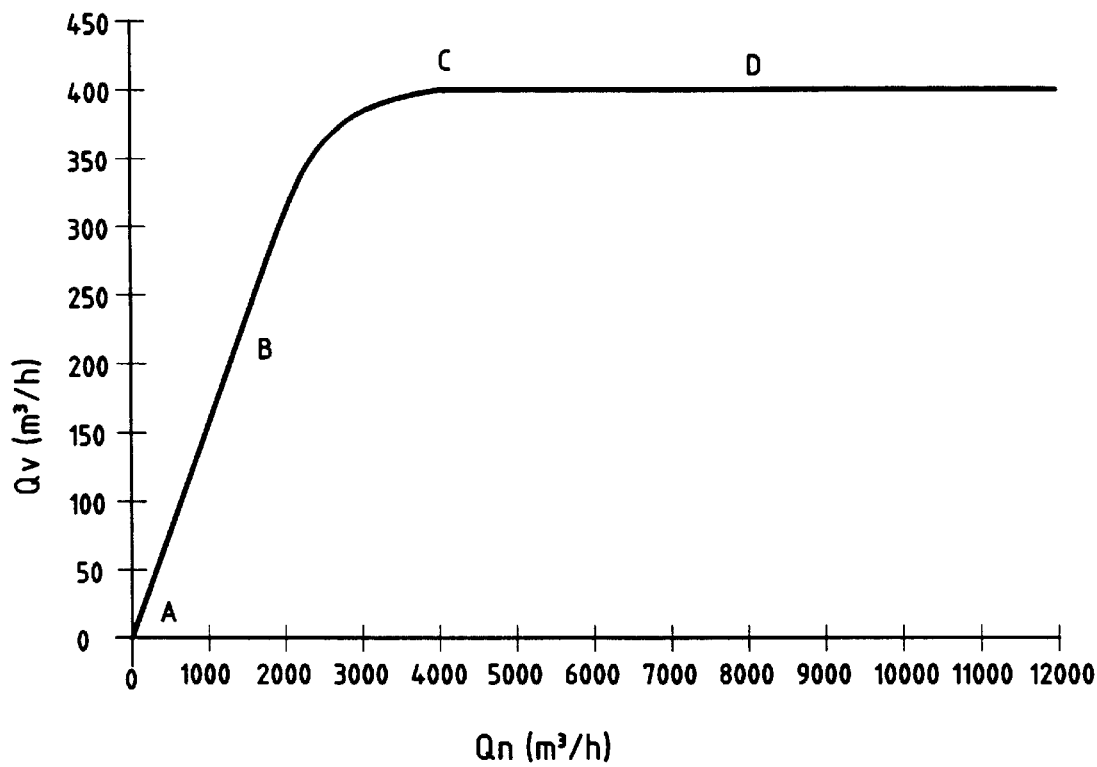
FIG. 5 is a graph showing how the raw volume flow rate Qv varies as a function of the normal flow rate Qn for variable pressure metering.
Figure 6:
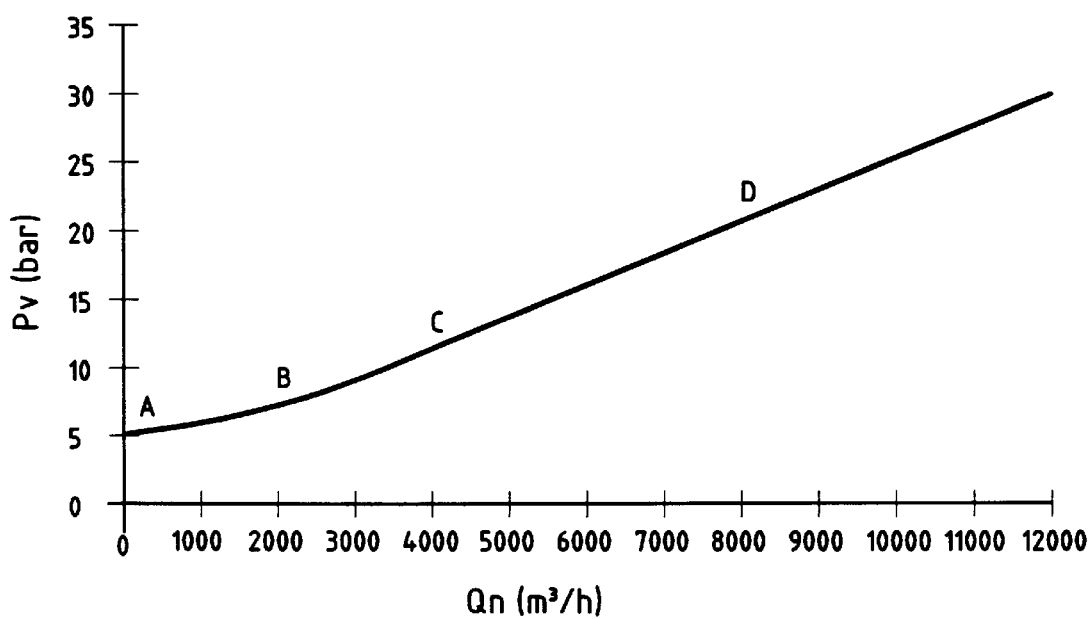
FIG. 6 is a graph showing how the metering pressure Pv varies as a function of the normal flow rate Qn.

The phenomena involved in variable pressure metering are explained below for various operating ranges A, B, C, and D shown in FIGS. 5 and 6 which are graphs respectively showing the raw volume flow rate Qv (in m$^3$/h) as a function of the normal flow rate Qn (in m$^3$/h) and the metering variable pressure Pv (in bars) as a function of the normal flow rate Qn (in m$^3$/h), for a flowrate limiter having a flow rate coefficient Q=400 m$^3$/h/bar (m$^3$.h$^{-1}$.bar$^{-1}$).

For the curve Qv=f(Qn) in FIG. 5, subsonic conditions can be seen below a value Qn equal to 4000 m$^3$/h, with sonic conditions above that value.

For the curve Pv=f(Qn) in FIG. 6, there can be observed a non-linear section below the value Qn equal to 4000 m$^3$/h, and a linear section above that value.

The curve of Pv as a function of Qn is calculated as follows:

Pv=Pa+((Qn/2Q)$^2$)Pa for Pa<Pv<2Pa

Pv=Qn/Q for Pv>2Pa with Pa=5 bar and Q=400 m$^3$.h$^{-1}$.bar$^{-1}$ at 12,000 m$^3$/h, Pv is indeed equal to 30 bars.

In the low flow rate operating range A, speed through the speed limiter is low so headloss is low. Metering pressure is substantially equal to the downstream pressure of the network and all of the expansion takes place in the expander-regulator.

In operating range B, the speed of the gas through the limiter increases and so the headloss increases accordingly. So long as the speeds are small compared with the speed of sound, the device remains in the incompressible range and the increasing pressure difference across the terminals of the limiter is proportional to the gain in kinetic energy. A portion of the expansion is performed in the expander-regulator, and the rest in the flowrate limiter.

In operating range C, the speed of the gas through the limiter becomes close to the speed of sound, and more complex (compressible) phenomena appear up to the critical point, where the maximum volume flow rate through the limiter is reached.

In operating range D, conditions are critical, i.e. the normal flow rate varies proportionally to the pressure upstream from the limiter. Thus, the metering pressure Pv continues to rise while the normal flow rate in the network increases and this continues until the intermediate pressure is close to the upstream pressure. At this point, the expander-regulator is fully open and expansion takes place almost entirely in the limiter. The expander-regulator continues to regulate so long as the rate demanded does not exceed its own capacity.

By appropriately dimensioning the meter and the limiter, a variable pressure metering station can be obtained of capacity (maximum acceptable normal flow rate) equal to that of a station that does not have variable pressure metering, while simultaneously increasing the dynamic range of the meter.

If the meter is constituted by a velocity-measuring flowmeter, e.g. having a spinner, or a volume-measuring flowmeter, then the dynamic range DYNcpv of metering at variable pressure is given as a function of the dynamic range DYNca of downstream metering by the following formula:

$$DYNcpv = Qn\ max/Qn\ min = Qmax/Qmin.Pe/Pa = DYNca.Pe/Pa$$

where Qmax and Qmin are the raw maximum and minimum flow rates through the meter under reference conditions for which the manufacturer certifies that the meter is accurate.

The intrinsic dynamic range of the meter is thus multiplied by the ratio Pe/Pa between the pressure Pe upstream from the expander (network pressure) and the pressure Pa downstream from the expansion station (delivery pressure). This makes it possible to achieve dynamic ranges of the order 100 to 150, while reducing the rating of the meter.

Variable pressure metering also makes it possible to increase the accuracy of metering at low flow rates without increasing the overall size of an expansion station. The risk of the meter freezing during a period of high consumption is also reduced. Furthermore, the presence of a flowrate limiter provides the meter with protection against excess speed.

A variable pressure metering device of the invention is described below structurally and in greater detail with reference to FIGS. 7 to 18, which meter makes it possible to obtain the advantages outlined above while being very simple to manufacture.

Figure 1:
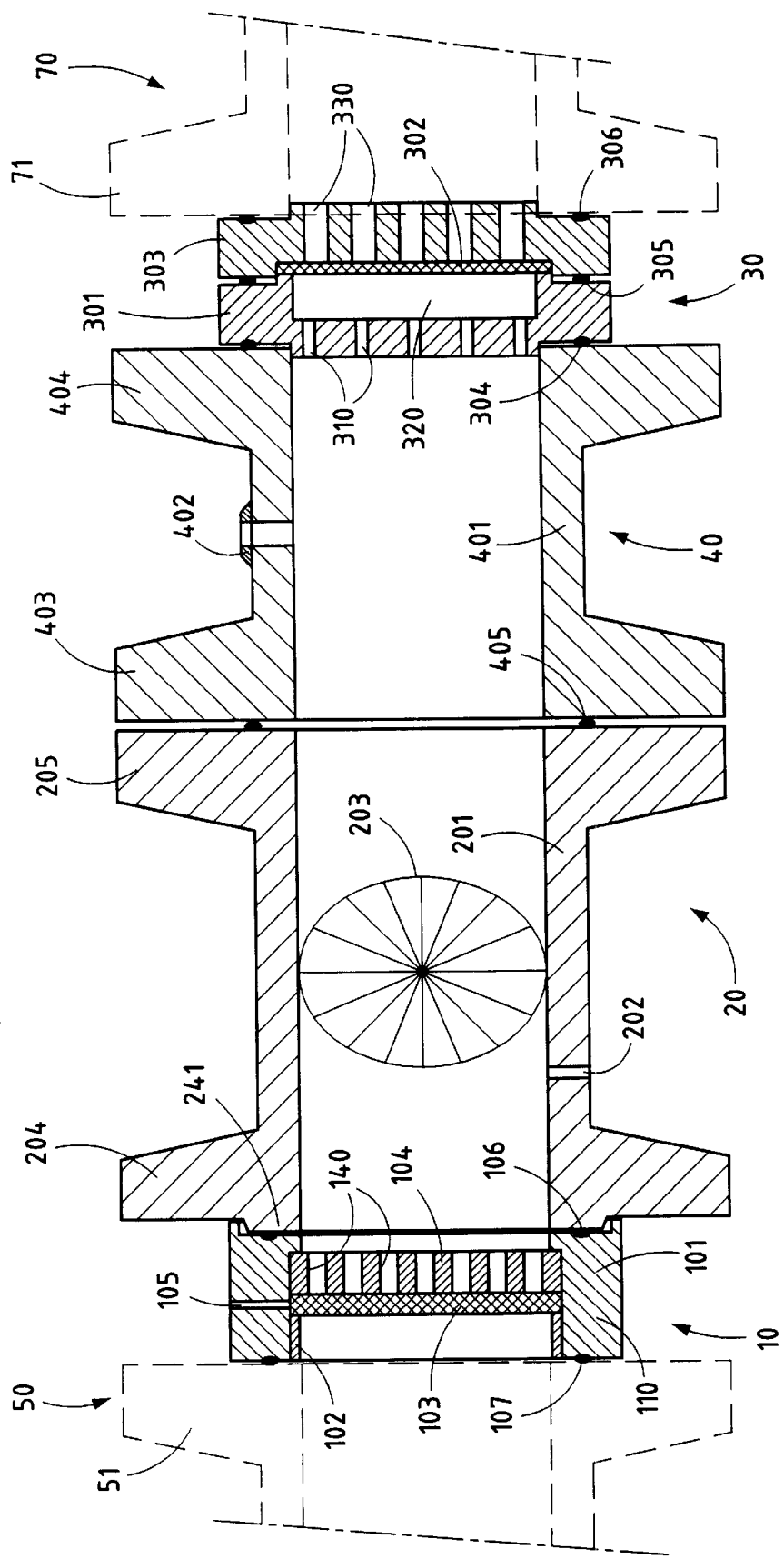
FIG. 1 is an overall axial section view of a compact gas metering device of the invention.
Figure 2:
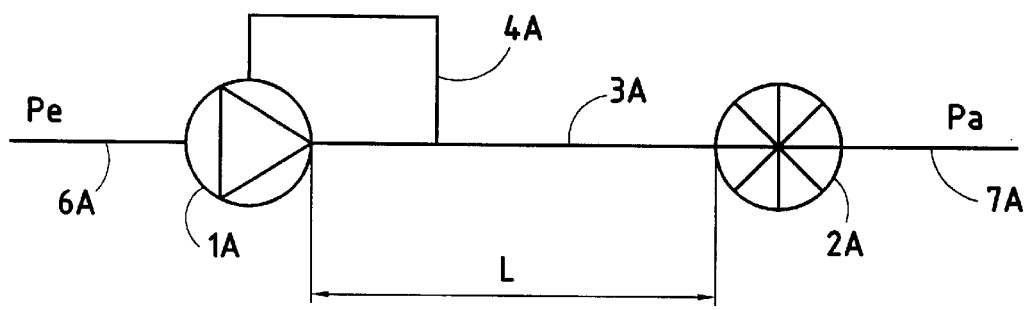
FIG. 2 is a theoretical diagram of a conventional gas distribution station with metering downstream from the expander-regulator.
Figure 3:
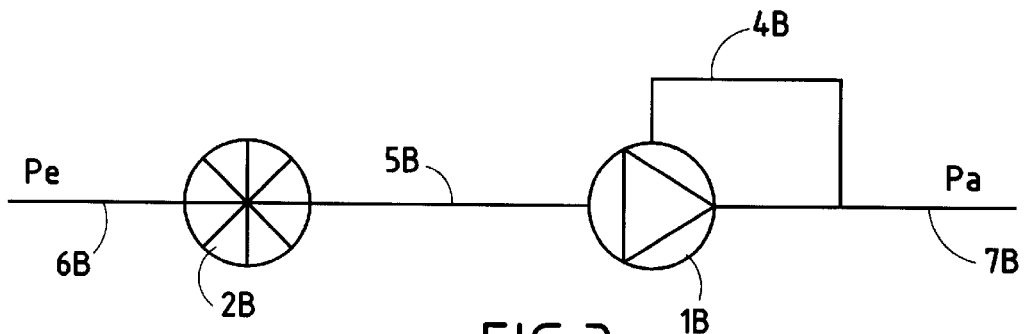
FIG. 3 is a theoretical diagram of a conventional gas distribution station with metering upstream from the expander-regulator.

FIG. 1 is an overall view of such a variable pressure metering device comprising, in modular manner, going from its upstream end towards its downstream end: a flow conditioner or straightener 10; a velocity meter 20; and a silent flowrate limiter 30. These three main modules are connected together in cascade. Thus, the straightener 10 is placed against the upstream flange 204 of the meter 20 while the limiter 30 is placed against the downstream flange of the meter 20 (when extender 40 is missing). This leads to the overall structure of the device being very simple, and its length can easily be less than four times the nominal diameter D of the pipes to which the device is connected.

The straightener 10 is interposed between the flange 51 of an upstream pipe segment 50 leading from the expander-regulator and the upstream flange 204 of the meter 20. The limiter 30 can be interposed in the same manner between the flange 71 of the downstream pipe 70 and the downstream flange 205 of the meter 20.

In FIG. 1, there is shown the particular case of a meter 20 which is fitted with an integrated pressure takeoff 202 but which does not include an integrated temperature takeoff. Under such circumstances, an extender 40 fitted with a tapping point 402 for temperature measurement is interposed between the meter 20 and the limiter 30. It is then the downstream flange 404 of the extender 40 which comes into contact with the limiter 30 and the upstream flange 403 of the extender 40 is connected to the downstream flange 205 of the meter 20. The extender 40 is thus an optional element which is omitted when the meter 20 includes an integrated temperature sensor, in which case the limiter 30 comes directly into contact with the downstream flange 205 of the meter 20.

The meter 20 is of the velocity meter type and may have an active element 203 of the spinner type.

Gaskets such as O-rings 107, 106, 405, 304, and 306 are interposed between the successive elements constituted by the upstream pipe 50, the straightener 10, the meter 20, the extender 40, and the limiter 30. A sealing gasket 305 is also interposed between the upstream web 301 and the downstream web 303 which constitute the limiter 30.

The cylindrical body 201 of the meter 20 and the cylindrical body 401 of the extender 40 define an inside diameter which corresponds to the nominal diameter of the upstream and downstream pipes 50 and 70.

With reference to FIGS. 1 and 7 to 10, there follows a description in greater detail of the configuration of a straightener 10 adapted to the metering device of the invention and serving to eliminate turbulence or other flow jet and rotation effects that can be imparted by the gas passing through the expander-regulator and through certain pipe elements situated upstream from the metering device such as double bends or Tees, for example.

Thus, the straightener or flow conditioner 10 placed at the inlet to the metering device of the invention, makes it possible, by means of its configuration, to obtain a flow through the meter which is simultaneously symmetrical about the axis of the pipe, without the stream of gas rotating, and with turbulence at a low level.

The straightener 10 essentially comprises four concentric elements that are circularly symmetrical about the axis of the device. A support ring 101 defines a circular opening that is concentric with the part itself and includes an upstream portion whose cylindrical opening is of a diameter that is slightly greater than the nominal diameter of the upstream pipe 50 and of the meter 20. The support ring 101 also has a shoulder 112 in its downstream portion that defines an opening whose diameter corresponds essentially to the nominal diameter of the pipe 50 and to that of the meter 20. A stack of three elements 102, 103, and 104 is disposed in the upstream portion of the body 110 of the support ring 101 and comes into abutment against the shoulder 112. This stack is made up of an annulus-forming spacer 102, a porous plate 103, and a perforated plate 104.

Figure 7:
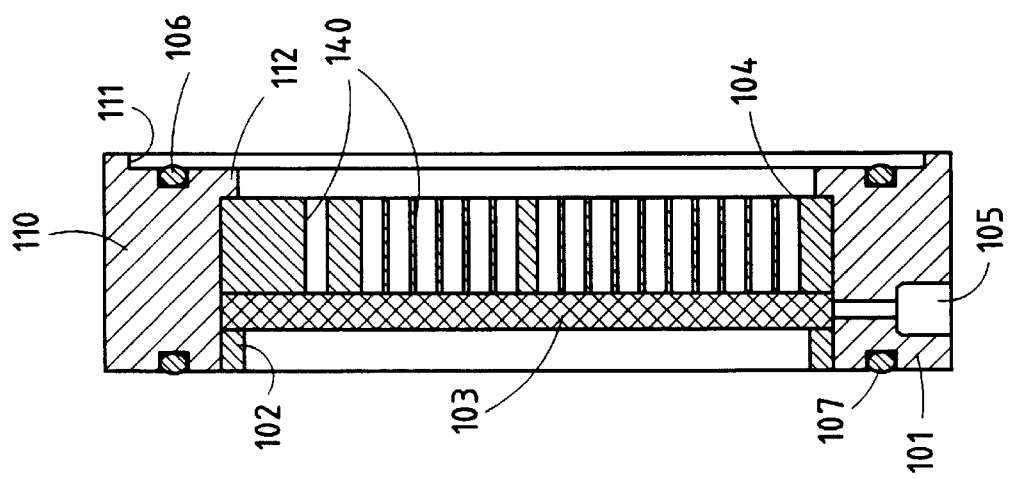
FIG. 7 is an axial section view through a first embodiment of a straightener incorporated in a device of the invention.

In an advantageous disposition, as shown in FIGS. 1 and 7, the porous plate 103 rests directly against the perforated plate 104, on the upstream side thereof, and the spacer annulus 102 is itself located upstream from the porous plate 103 and holds it pressed against the perforated plate 104. With this disposition, the porous plate 103 can be uniformly supported by the perforated plate 104. This is important in the event of the porous plate 103 becoming clogged. Under such circumstances, the headloss across the porous plate 103 can be large and the pressure stresses on said plate can exceed the strength of its material. Because the perforated plate 104 can accommodate extra forces exerted on the porous plate 103 it prevents the porous plate 103 becoming deformed or breaking.

Figure 8:
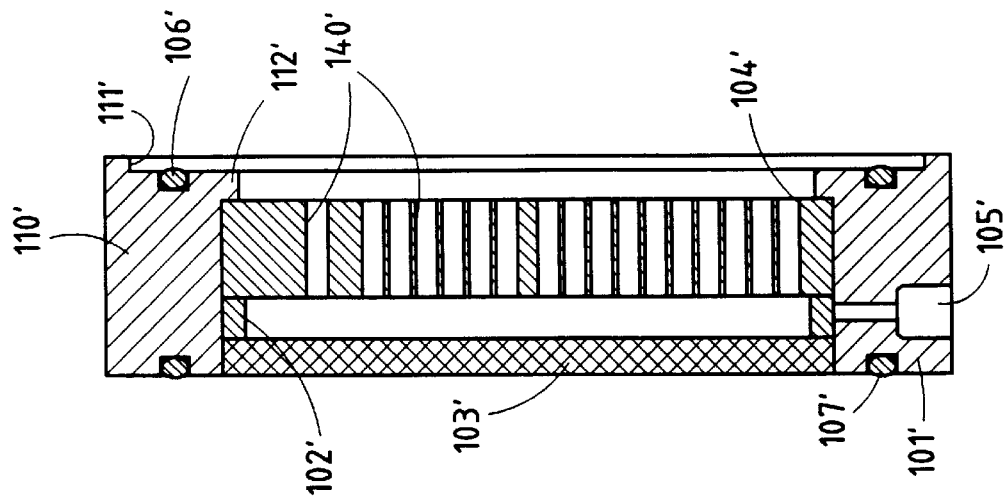
FIG. 8 is an axial section view of a second embodiment of a straightener incorporated in a device of the invention.

When a clean gas is used in which the probability of porous materials clogging is low, or if regular maintenance inspections are performed, it is possible for the straightener 10 to have the configuration shown in FIG. 8. In FIG. 8, the various elements corresponding to those of the straightener 10 shown in FIG. 7 are designated by the same reference numerals, together with prime symbols. The embodiment of FIG. 8 differs from that of FIG. 7 essentially by the fact that the spacer annulus 102' is interposed between the porous plate 103 and the perforated plate 104'. The elements 103', 102', and 104' thus constitute a stack in this order which is pressed against the shoulder 112' of the support ring 101'. In this configuration, a gap is left between the porous body 103' and the perforated plate 104'. This makes it possible to improve the efficiency of the straightener concerning attenuating asymmetry.

The thicknesses of the perforated plate 104, 104', of the porous plate 103, 103', and of the spacer annulus 102, 102' can be optimized to obtain best effectiveness against disturbances in the flow. The diameters, the number, and the dispositions selected for the holes in the plate also make it possible to perform such optimization. Preferably, the sum of the thicknesses of these three elements constituting the stack placed against the shoulder 112, 112' is slightly greater than the length in the axial direction of the circular opening through the support ring 101, 101', measured between the shoulder 112, 112' and the upstream face of the support ring 101, 101', such that the assembly when clamped between the flange 51 of the upstream pipe 50 and the upstream flange 204 of the meter 20 causes the porous plate 103, 103' to be crushed slightly, thereby completely locking the stack 102, 103, 104 or 103', 102', 104'. This avoids any slack that could give rise to vibration and noise.

Gaskets 106, 106'; 107, 107' such as O-rings are placed in annular grooves machined in the upstream and downstream faces of the support ring 101, 101' which are in contact respectively with the top face of the flange 204 of the meter 20 and the raised face of the flange 51 of the upstream pipe 50.

As shown in FIGS. 7 and 8, an additional shoulder 111, 111' can be provided at the periphery of the downstream face of the support ring 101, 101' so as to facilitate centering relative to the flange 204 of the meter 20. In this case, the outside diameter of the support ring 101, 101' is slightly greater than that of the flange 204, and the additional shoulder 111, 111' fits around the peripheral surface of the flange 204. Axial contact between the support ring 101, 101' and the flange 204 occurs in all cases via the gaskets 106, 106'. The outside diameter of the support ring 101, 101' can also be smaller than that of the flange 204. In which case, the flange 204 has a raised face 241 (FIG. 1).

The inside diameter of the spacer annulus 102, and likewise that of the shoulder 112 are both equal to the inside diameter of the upstream pipe 50 and of the meter 20 to avoid sudden changes of inside diameter which could disturb the gas flow.

A radial hole 105, 105' is drilled through the body 110, 110' of the support ring 101, 101' to receive the exhaust from the pilot of the expander-regulator. This makes it possible in the meter 20 to take account of the flow rate through the pilot system of the expander placed upstream from the straightener 10. In the embodiment of FIG. 7, the hole 105 opens out into the porous plate 103. This has the effect of diffusing the jet caused by the pilot flow, and thus of eliminating the asymmetry that could otherwise be generated at low flow rates.

The density of the porous body 103 can be adapted as a function of requirements. The grain of the porous body 103 must be fine enough to eliminate effectively any disturbances in the flow, however a larger grain can be selected when it is essential to avoid any risk of clogging. Advantageously, it is possible to use a porous material constituted by a highly expanded nickel-chromium foam having a density of 0.6 g/cm$^3$ in which the ratio of solid volume over total volume is about 6%. An example of such a material is sold by Sumitomo Europe Ltd. under the name Celmet. The area in contact with the flow is a function of mesh size and varies from 500 m$^2$/m$^3$ for coarse mesh to 2500 m$^2$/m$^3$ for fine mesh. The finer the mesh, the greater the increase in headloss due to viscosity. For air at atmospheric pressure, at a speed of 10 m.s$^{-1}$, the headloss coefficient (headloss/dynamic pressure) lies in the range 2.7 to 15.7, thereby ensuring high effectiveness in eliminating asymmetry and in attenuating high levels of turbulence. The presence of the porous material 103 protects the meter 20 against being spattered by debris or by blocks of ice or of hydrates that could damage the blades of the spinner 203 of the meter when a spinner meter is used.

Figure 9:
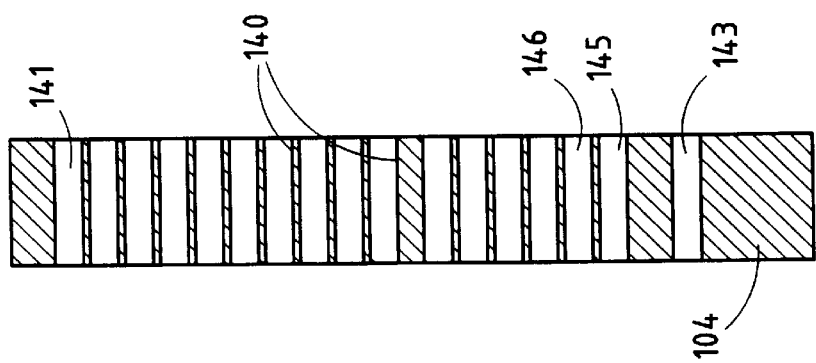
FIG. 9 is an axial section view on line XI—XI of FIG. 10 through an example of a perforated plate of a straightener incorporated in a device of the invention.
Figure 10:
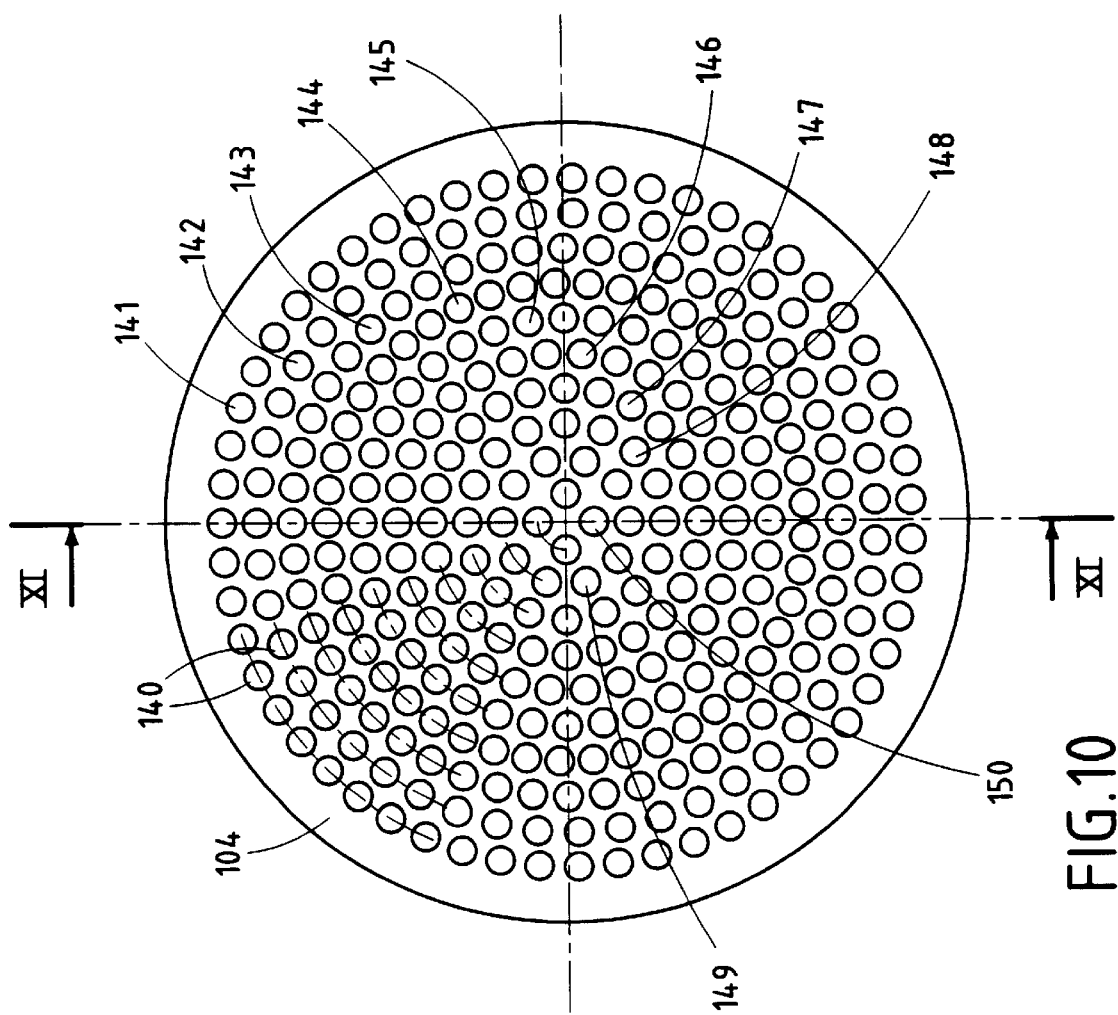
FIG. 10 is a front view of the FIG. 9 perforated plate.

An example of the perforated plate 104 suitable for a pipe having a nominal diameter of 150 mm is shown in FIGS. 9 and 10. A set of 335 holes 140 of diameter 5.5 mm are distributed in uniform manner over the entire section of the plate 104. The holes 140 comprise holes distributed over ten concentric rings 141 to 150. By way of example, the holes 140 distributed in concentric rings comprise, going in from the periphery of the plate: a ring 141 having 65 holes; a ring 142 having 55 holes; a ring 143 having 48 holes; a ring 144 having 45 holes; a ring 145 having 36 holes; a ring 146 having 30 holes; a ring 147 having 24 holes; a ring 148 having 18 holes; a ring 149 having 10 holes; and a ring 150 having 4 holes. Within any one ring the holes are uniformly distributed, with the gap between the mean lines of adjacent rings being 7.5 mm, for example.

The diameter of the holes 140 may lie in the range 1/30th to 1/8th of the nominal diameter of the pipe. The total number of holes 140 and the number of concentric rings may naturally vary as a function of the nominal diameter of the pipe.

The total through area for the gas must be sufficient to minimize headloss in the straightener and to avoid putting a limit on the increase in dynamic range that is provided by using a variable pressure meter.

The holes 140 of the perforated plate 104 are not necessarily all of the same diameter. Nevertheless, manufacture can be simplified if a perforated plate is made having a multiplicity of small holes all having the same diameter as shown in FIG. 10.

A straightener of the invention, which occupies small bulk, having a width of about one-third the nominal diameter of the gas-conveying pipe, makes it possible to omit the rectilinear lengths that are normally advisable, and to place the meter 20 immediately downstream from the expander, or from some other obstacle present in the expansion station, such as a bend, a double bend, a Tee, a diverging portion, or a converging portion. By way of comparison, when a conventional straightener is used, American standard AGA 7 concerning spinner meters recommends a standard configuration using a conventional straightener and leaving a rectilinear length of not less than five times the nominal diameter of the pipe between the downstream face of the straightener and the meter, while in the absence of a straightener the rectilinear length between the meter and the last obstacle is required to be ten times the nominal diameter of the pipe.

By way of comparison, the straightener 10 of the invention which is of a length that is much less than the nominal diameter of the pipe, makes it possible to minimize the distance between the meter 20 and the last obstacle on the upstream pipe 50.

In addition, insofar as the straightener 10 is integrally located between the assembly flanges and is not inserted in a rectilinear portion of pipework, assembly and disassembly are made easier, since fixing can be achieved merely by means of bolts, and there is no need to withdraw a portion of pipe. Furthermore, the disposition of the elements 102, 103, and 104 in the form of a stack placed in the support ring 101, makes it possible, without modifying the configuration of the expansion station, to modify easily the configuration of the straightener 10 and to exchange the porous plate 103, the perforated plate 104, or the spacer annulus 102 to replace a faulty element or to change the characteristics of the straightener, or even to eliminate the straightener function, in which case only the support ring 101 is retained. The modular design of the straightener 10 thus constitutes an essential characteristic of the invention.

With reference to FIGS. 1 and 11 to 18, there follows a description of embodiments of the limiter 30 in accordance with the invention.

The role of the limiter 30 is to limit the gas flow section so that the raw volume flow rate which passes through the meter 20 does not exceed the maximum capacity of the meter, i.e. its nominal flow rate. If the gas passes through the meter 20 at excessive speed that is too fast or that continues for too long, then the meter can be damaged by its blades being broken or by the bearings of the spinner being damaged.

The flowrate limiter 30 essentially comprises an upstream web 301 which defines a perforated plate having some number of calibrated holes 310, a porous plate 302 whose structure and characteristics can be similar to those of the porous plate 103 in the straightener 10, and a downstream web 303 defining a plate perforated by holes 330 of individual section that is much greater than those of the calibrated holes 310 and of total through section that is likewise much greater than the total through section of the holes 310 in the upstream web 301, and very close to the total through section of the downstream pipe 70.

The upstream portion of the downstream web 303 defines a housing 331 of inside diameter corresponding to the outside diameter of the porous plate 302 such that the porous plate 302 can be placed in the housing 331 immediately against the downstream web portion which constitutes the plate perforated by the holes 330 and which serves essentially to provide mechanical support for the porous plate 302. The upstream web 301 itself has on its downstream face (FIG. 11) a spacer annulus 313 which engages in the housing 331 of the downstream web 303 and bears against the porous plate 302 to press it against the perforated plate constituting the end wall provided by the downstream web 303, thereby preventing any slack which could give rise to vibration. An empty space 320 is always provided in the upstream web 301 between the plate perforated by calibrated holes 310 and the porous plate 302 (FIG. 1). This empty space 320 preferably has a thickness in the axial direction that is about twice the diameter d of the calibrated holes 310. The empty space 320 enables the porous plate 302 to act as a silencer and to absorb to a greater extent the noise emitted by the shockwaves due to the gas recompressing and to the turbulence following the sonic expansion of the gas by the calibrated holes 310.

The limiter assembly 30 is thus modular, enabling the upstream web 301, the porous part 302, and the downstream web 303 to be exchanged, while nevertheless being compact, since the total length of the limiter 30 in the axial direction can be about one-third of the nominal diameter of the upstream and downstream pipes 50 and 70. Assembly and disassembly are facilitated between the downstream flange 205 of the meter (or as shown in FIG. 1, the downstream flange 404 of the extender 40) and the upstream flange 71 of the downstream pipe 70. Sealing between the various juxtaposed elements is provided by O-rings 304, 305, and 306 disposed in respective annular grooves 312, 332, 334 formed in the upstream and downstream webs 301 and 303.

Figure 11:
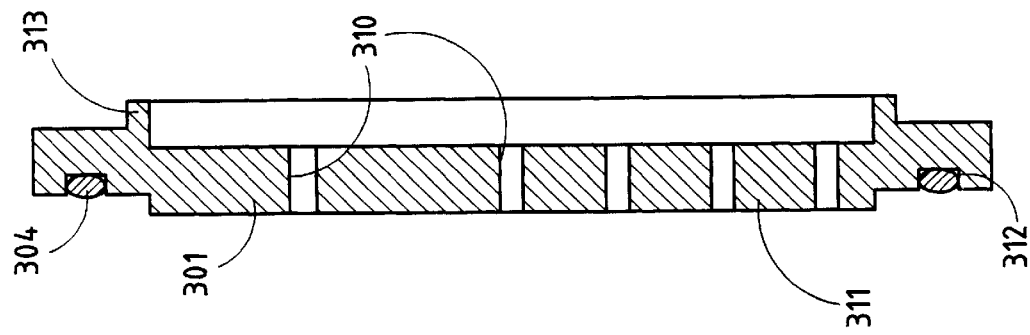
FIG. 11 is an axial section view on line XI—XI of FIG. 12 through a first example of an upstream web of a limiter incorporated in a device of the invention.
Figure 12:
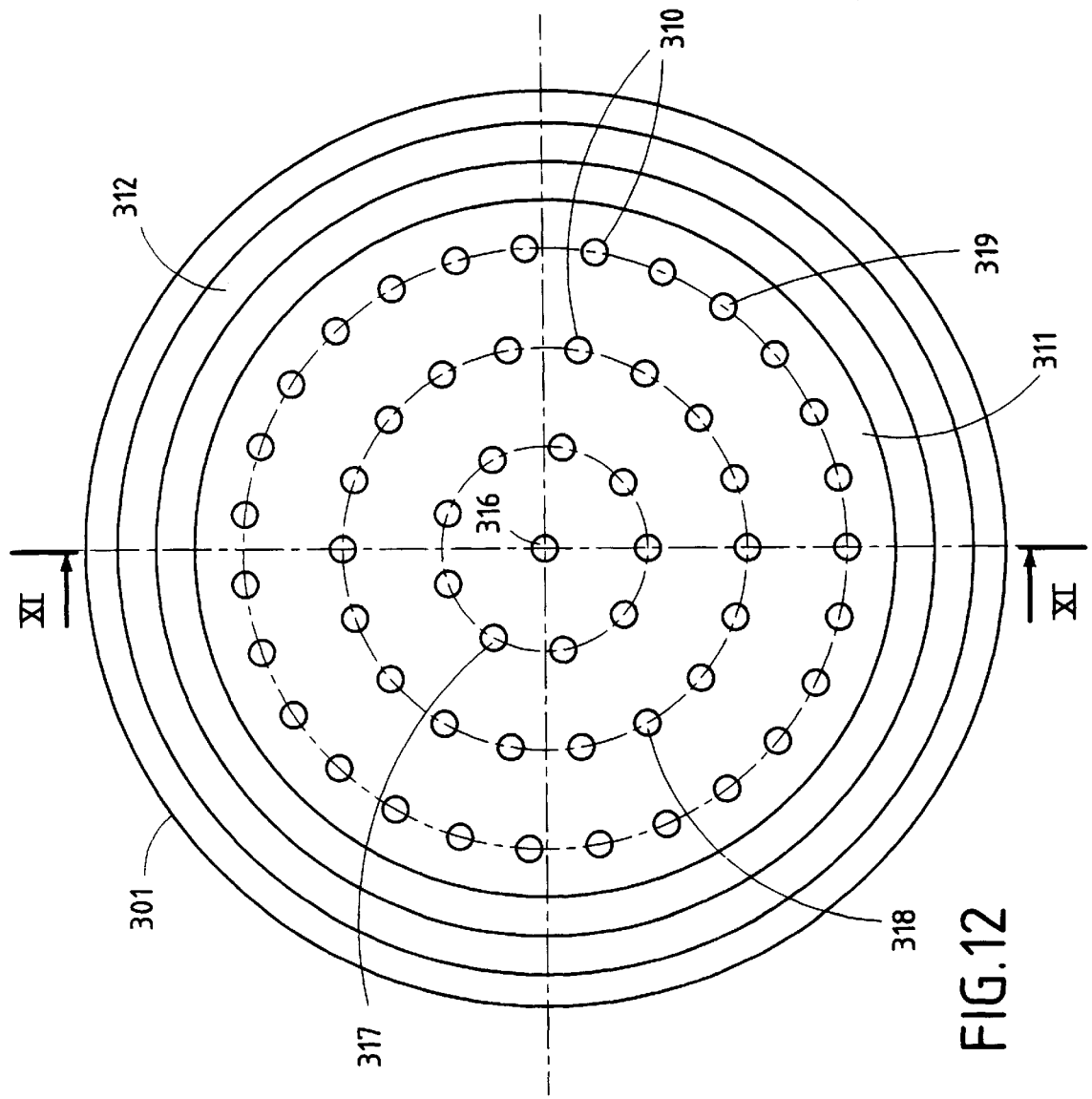
FIG. 12 is a front view of the upstream web of FIG. 11.
Figure 13:
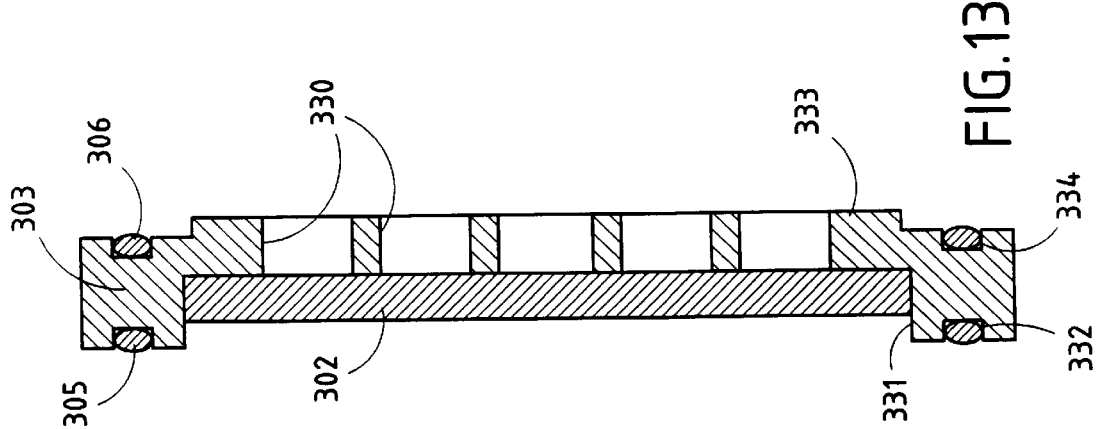
FIG. 13 is an axial section view on line XIII—XIII of FIG. 14 of a first example of a downstream web of a limiter incorporated in a device of the invention.

As can be seen in FIGS. 11 and 12, the upstream and downstream webs 301 and 303 are of shapes that are easy to machine. FIGS. 11 and 13 in particular show that the portions 311 and 333 of the upstream and downstream webs 301 and 303 that are pierced with holes 310 and 330, respectively, may project slightly outwards respectively for centering in the flange 205 of the meter 20 (or the flange 404 of the extender 40) and in the flange 71 of the downstream pipe 70. The outside diameter of the projecting perforated plates 311, 333 of the upstream and downstream webs 301 and 303 thus corresponds to the inside diameter of the flange of the meter 20 or of its extender 40, and of the downstream pipe 70.

The upstream face of the upstream web 301 is pierced by a number n of calibrated holes 310 through which the gas must pass. This is the portion which acts as a limiter, proper. The holes 310 all have the same diameter d and the same flow coefficient q. It is their number n which defines the total through section and the overall flow coefficient Q of the limiter. The number n of holes is calculated so that the flow rate coefficient Q of the limiter, i.e. the number of $m^3$ per hour and per bar of upstream pressure under critical conditions, is less than or equal to the maximum raw flow rate Qmax of the meter.

The flow rate coefficient Q of a hole 310 is given by:

$$q = KS\sqrt{TcP_0/2\rho_0 T_0}$$

where S is the section of a hole, K is a coefficient which depends on the shape of the hole, Tc is the temperature upstream from the limiter, and $P_0$, $T_0$, and $\rho_0$ are the normal conditions of pressure, temperature, and density, (e.g. 1013.25 mbar, 273.15 K and the density of the gas in question). By way of example, the cylindrical holes 310 may be made with a diameter of about 5 mm. Under such circumstances, the geometrical coefficient is then about K=0.8. In this particular case, the flow rate coefficient of one hole, for a gas having a density of 0.73 $kg/m^3$ at 15° C., is about 15 $m^3$/h.

The number n of holes is determined as follows:

$$Q = nq$$

where Q is the overall flow rate coefficient of the limiter which is selected by the operator and which must in any event be less than or equal to the nominal flow rate of the meter. The accuracy with which the limiter can be matched is equal to the flow rate coefficient of one hole. For example when it is desired to have a limiter that provides as accurately as possible the nominal flow rate of a G400 meter (650 $m^3$/h), then n is selected to be equal to 43, giving a flow rate coefficient of 645 $m^3$/h. When designing the dimensions of the limiter, it is necessary to take into account the fact that the quality of the gas may vary and that its density may also vary. A decrease in density of 10% gives rise to an increase in the flow rate coefficient of the holes, and consequently to an increase in the overall flow rate coefficient, where said increase is about 5%. In the case under consideration, the overall flow rate coefficient would then be established at 676 $m^3$/h which is slightly greater than the design maximum flow rate, but nevertheless remains acceptable.

The size of the holes 310 is an important parameter. They must not be too large for several reasons. Firstly, the frequency of the noise generated by a jet of gas passing through a small-sized orifice is higher than when passing through an orifice of larger size, and high frequencies are easier to attenuate. Secondly, small-sized holes have a smaller flow rate coefficient thus making it possible to match the overall flow rate coefficient of the limiter more finely. For everyday use in a transport network, holes having a diameter in the range 4 mm to 6 mm, and preferably of 5 mm constitute a good compromise. In addition, the small size of the holes makes it possible for one or more of them to be closed off at will by means of respective screws in order to match the flow rate coefficient more finely to the rating of the meter as a function of the density of the gas.

Once the number of holes has been determined, they are distributed as uniformly as possible over the section of the upstream web. The calibrated holes 310 are distributed over three to six concentric rings, depending on the diameter of the pipe, and the rings are formed about a central hole.

As a general rule, the total number of calibrated holes lies in the range 8 to 100.

Depending on the rating of the meter in use, the flow rate coefficient will usually lie in the range 160 $m^3$/h to 1600 $m^3$/h. The flow rate coefficient g of a single hole having a diameter of about 5 mm lies in the range 14 $m^3$/h to 18 $m^3$/h, with the number of holes lying in the range 8 to 100. Depending on the rating of the meter, the diameter of the pipe used is not the same. Pipe diameter can be 80 mm for Qmax=160 $m^3$/h, to 200 mm for Qmax=1600 $m^3$/h. Depending on the diameter of the pipe, the holes are then distributed over three to six rings, so as to obtain downstream flow that is as uniform as possible.

FIG. 12 shows one example of how calibrated holes 310 having a diameter of 5.3 mm can be distributed for use with a G650 type meter and a nominal diameter of 150 mm.

Around a central hole 316, there can be seen 55 calibrated holes regularly distributed over three concentric rings 317, 318, and 319 whose midlines are spaced apart from one another by about 2.5 mm. The inner or first ring 316 has nine holes, the intermediate ring 318 has 18 holes, and the outer ring 319 has 27 holes.

Figure 14:
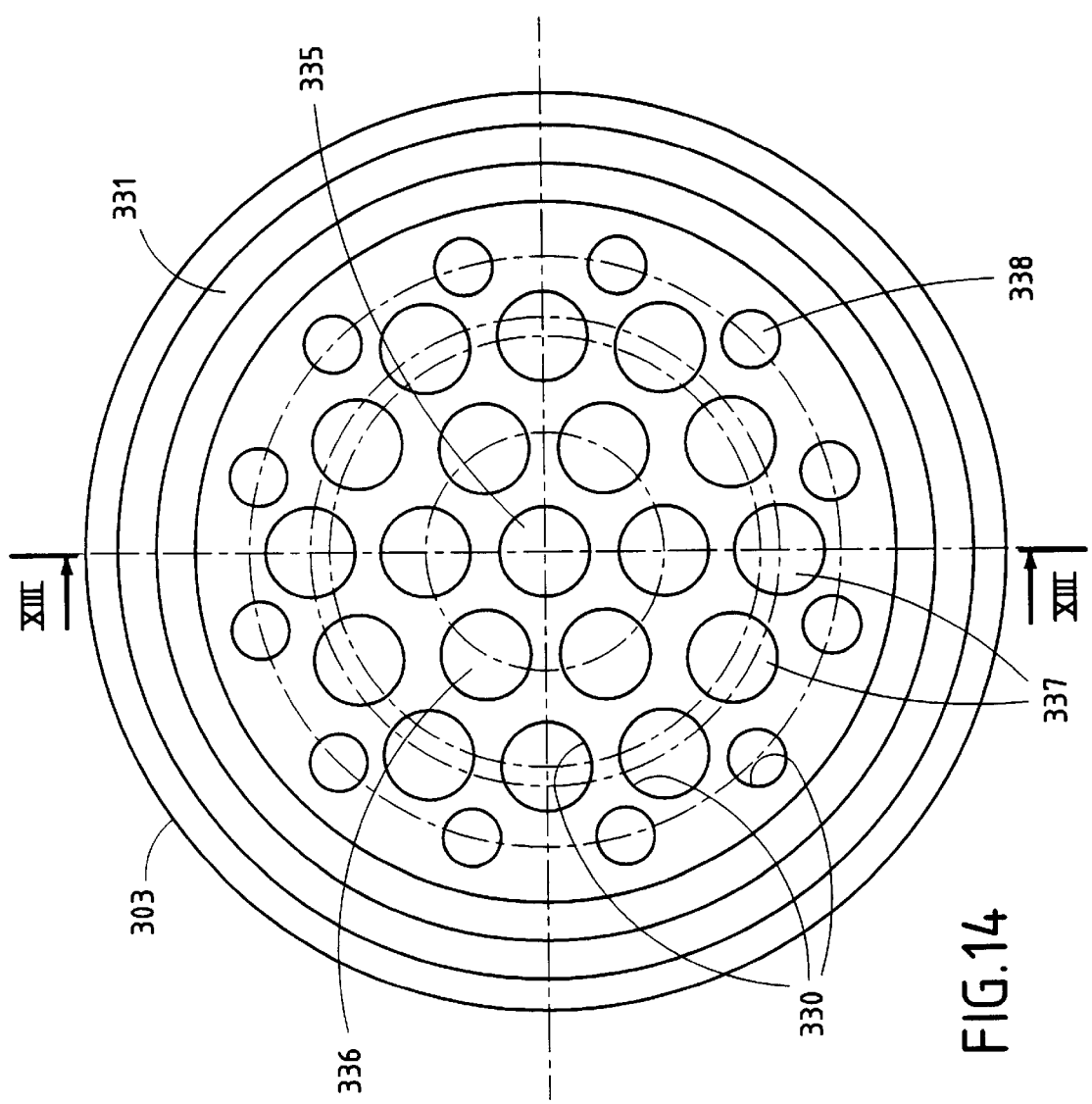
FIG. 14 is a front view of the downstream web of FIG. 13.
Figure 16:
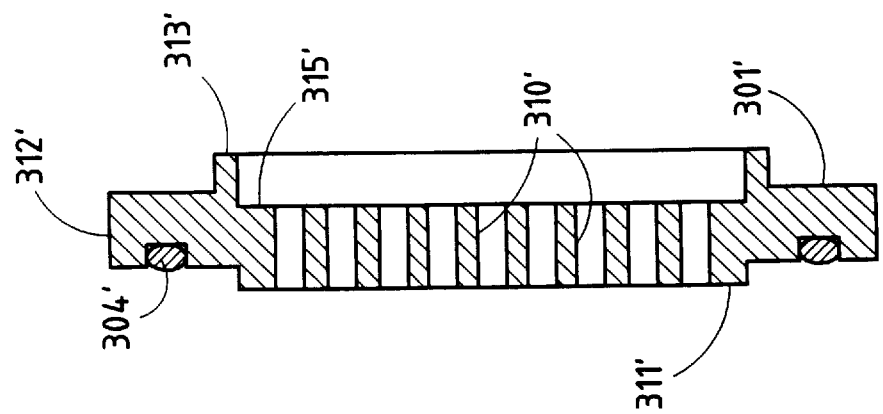
FIG. 16 is an axial section view on line XVI—XVI of FIG. 15.

FIGS. 13 and 14 show an example of a downstream web 303 adapted to the upstream web 301 of the above-described example. In this case, the perforated plate 333 of the downstream web 303 has a central hole 335 with a diameter of 20 mm, a first ring 336 having six holes each with a diameter of 20 mm, a second ring 337 having 12 holes each with a diameter of 20 mm, and a third ring 338 having 12 holes each with a diameter of 12 mm. The holes 330 are distributed uniformly and are of a diameter that is considerably greater than the diameter of the calibrated holes 310 or of the holes 110 in the straightener 10. Nevertheless, it is not necessary for the holes 330 to be accurately situated on concentric circles. Thus, FIG. 14 shows that the 12 holes of the ring 337 actually define a hexagon.

FIGS. 15 to 18 show another particular example of the component elements of a limiter 30 of the invention for a meter device having a G400 type meter with a nominal diameter of 100 mm. FIGS. 15 to 18 use the same reference numerals as FIGS. 11 to 14 for elements that perform the same functions, but accompanied by the prime symbol. These various elements are therefore not described again in detail.

Figure 15:
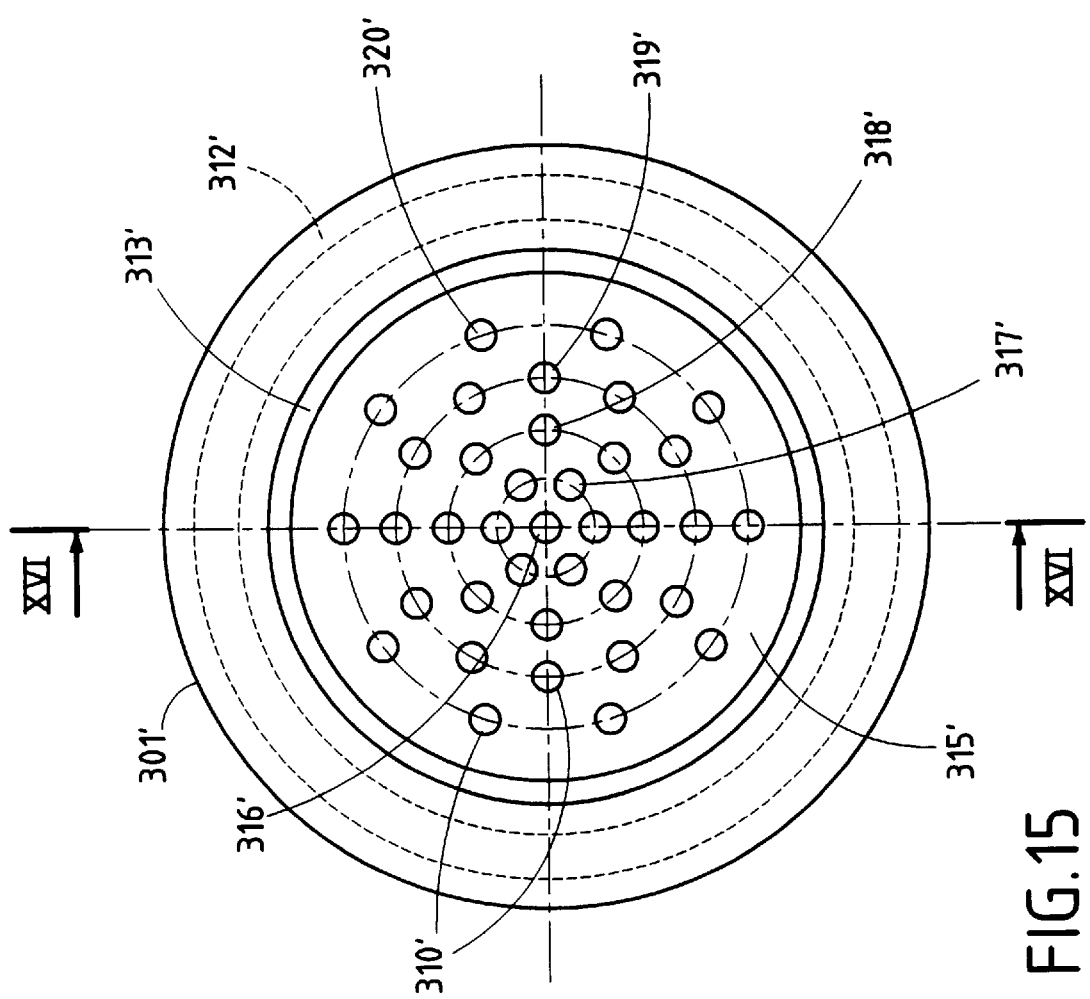
FIG. 15 is a front view of a second example of an upstream web of a limiter incorporated in the device of the invention.

It will be observed in FIG. 15 that the perforated plate 311' of the upstream web 301' has 37 calibrated holes 310' of 5.2 mm diameter, and around a central hole 316' they comprise a first ring 317' of 6 holes, a second ring 318' of 8 holes, a third ring 319' of 12 holes, and a fourth ring 320' of 10 holes. The holes 310' are uniformly distributed in each ring. The spacing between the rings is about 10 mm.

Figure 18:
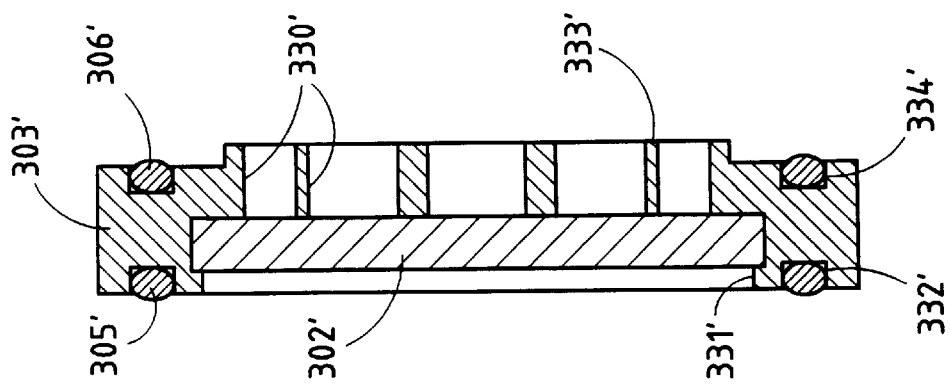
FIG. 18 is an axial section view on line XVIII—XVIII of FIG. 17.
Figure 17:
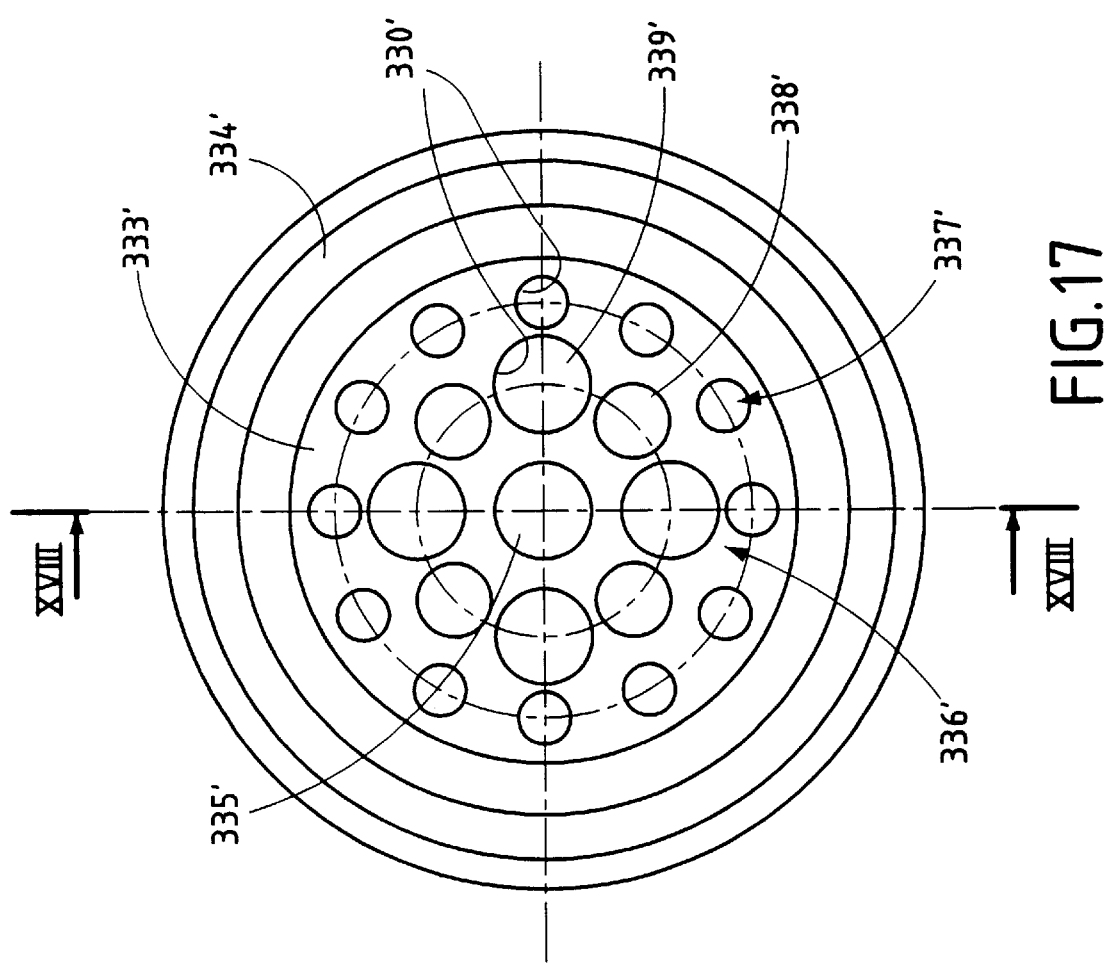
FIG. 17 is a front view of a second example of a downstream web of a limiter incorporated in a device of the invention.

The perforated plate 333' of the downstream web 303' in FIGS. 17 and 18 has a central hole 335' of 20 mm diameter, a first ring 336' of 8 holes, and a second ring 337' of 12 holes of 10 mm diameter. It can be seen that for the downstream web 303', the diameter of the holes 330' can be different within the plate and within a given ring so as to maximize the flow section. Thus, the ring 336' has four holes 338' of 15 mm diameter alternating with four holes 337 of 20 mm diameter.

The configurations given in FIGS. 11 to 18 are not limiting. For the downstream web 303, it is generally appropriate to have 20 to 40 holes uniformly distributed in two to four concentric rings about a central hole.

Figure 19:
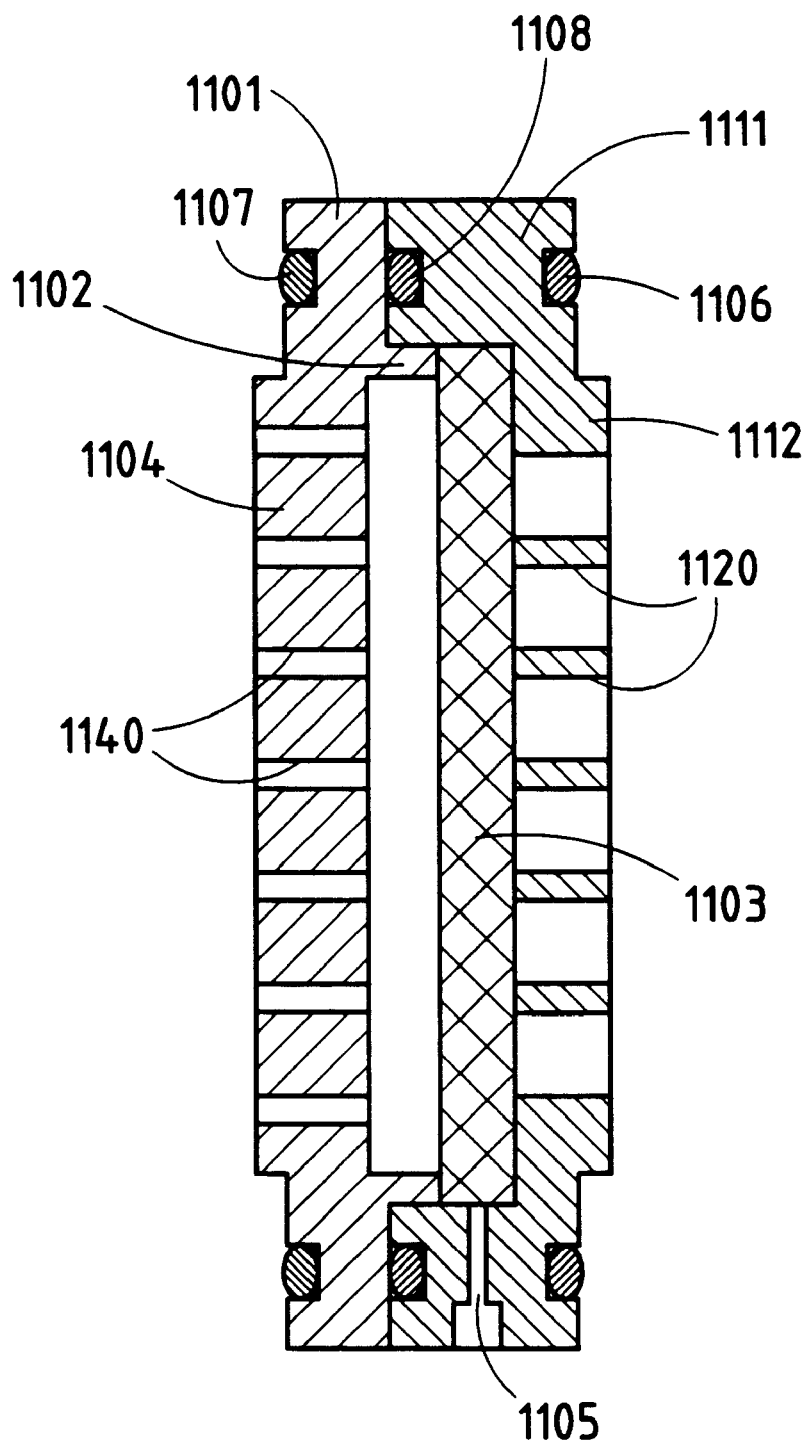
FIG. 19 is an axial section view of a third particular embodiment of a straightener incorporated in a device of the invention.

FIG. 19 shows a third embodiment of a straightener 10 which is slightly more complex in structure than the straightener of FIGS. 7 and 8, but has the advantage of being made in a manner that is more similar to that of the limiter 30, thereby making it possible to rationalize manufacture to some extent.

In the embodiment of FIG. 19, the plate 1104 perforated by holes 1140 can be made with holes 1140 of dimensions and in a distribution that are entirely analogous to those described above with reference to the holes 140, 140' of perforated plates 104, 104'. The perforated plate 1104 is nevertheless incorporated in an upstream web which is itself analogous to the upstream web 301, 301' of the limiter 30.

The perforated plate 1104 is thus constituted by a central portion of an upstream web whose peripheral portion defines firstly a spacer 1102 acting as the spacer 102 of FIG. 7, and secondly an upstream portion 1101 of a support ring. In the embodiment of FIG. 19, the perforated plate 1104 is upstream from a porous plate 1103 which is identical to the porous plate 103 of FIG. 7. This porous plate 1103 is held pressed without play by the spacer 1102 against a support plate 1112 which is perforated by holes 1120 of individual section that is greater than the holes 1140 in the perforated plate 1104 and providing a total flow section that is much greater than the total flow section through the perforated plate 1104. The perforated plate 112 is constituted by central portion of a downstream web whose peripheral portion defines a downstream portion 1111 of the support ring of the straightener constituting the embodiments of FIGS. 7 and 8. The downstream web can thus have a configuration analogous to that of the downstream web 303, 303' of the limiter 30. O-rings 1106, 1107, and 1108 provide sealing between the peripheral portions of the upstream and downstream webs in a manner similar to the O-rings 306, 304, and 305 in FIGS. 11 and 13.

What is claimed is:

1. A compact variable-pressure gas metering device for metering a volume of gas flowing along a pipe, downstream from an expander-regulator, and comprising in succession: a flow straightener, a velocity-measuring flowmeter, and a silent flowrate limiter; wherein the straightener is disposed between a flange of an upstream pipe for coupling to the expander-regulator, and an upstream flange of the flowmeter, wherein the limiter is disposed between a downstream flange of the flowmeter, and a flange of a downstream pipe, wherein the straighter comprises a support ring in which there are mounted in order, from upstream to downstream, a spacer in the form of an annulus, a first porous plate and a first perforated plate perforated by holes co-operating with the first porous plate, and wherein the limiter comprises an upstream web defining a second perforated plate perforated by a defined number n of calibrated holes of total flow section that is much less than the flow section of the first perforated plate, a second porous plate, and a downstream web defining a third perforated plate perforated by holes of section that is greater than the section of the calibrated holes of the second perforated plate of the upstream web and of total flow section that is much greater than the total flow section of the second perforated plate of the upstream web.

2. A compact variable-pressure gas metering device for metering a volume of gas flowing a long a pipe, downstream from an expander-regulator, and comprising in succession; a flow straightener, a velocity-measuring flowmeter, an extender with a temperature takeoff and a silent flowrate limiter; wherein the extender is provided with an upstream flange and with a downstream flange, wherein the straightener is disposed between a flange of an upstream pipe for coupling to the expander-regulator, and an upstream flange of the flowmeter, wherein the limiter comprises an upstream web and a downstream web, wherein the extender is interposed between a downstream flange of the flowmeter and the upstream web of the limiter, wherein the limiter is disposed between the downstream flange of the extender associated with the flowmeter, and a flange of a downstream pipe, wherein the straightener comprises a support ring in which there are mounted in order, from upstream to downstream, a spacer in the form of an annulus, a first porous plate and a first perforated plate perforated by holes co-operating with the first porous plate, and wherein the limiter comprises said upstream web defining a second perforated plate perforated by a defined number n of calibrated holes of total flow section that is much less than the flow section of the first perforated plate, a second porous plate, and said downstream web defining a third perforated plate perforated by holes of section that is greater than the section of the calibrated holes of the second perforated plate of the upstream web and of total flow section that is much greater than the total flow section of the second perforated plate of the upstream web.

3. A device according to claim 1 or claim 2 wherein the holes of the first perforated plate are distributed uniformly over the entire area of said first perforated plate.

4. A device according to claim 1, wherein the support ring has, in the vicinity of its downstream face, a shoulder projecting radially inwards from the support ring, and wherein the first perforated plate is placed directly in contact with said shoulder.

5. A device according to claim 4, wherein the first perforated plate, the first porous plate, and the spacer constitute a stack coming into abutment against the shoulder of the support ring, and wherein the sum of the thicknesses in the axial direction of the first perforated plate, of the first porous plate, and of the spacer is slightly greater than the distance in the axial direction between the shoulder of the support ring and the upstream face of said support ring in such a manner that clamping the stack between the flange of the upstream connection pipe and the upstream flange of the flowmeter compresses the first porous plate to a small extent.

6. A device according to claim 4, wherein the first porous plate is disposed directly against the first perforated plate and the spacer in the form of an annuls is disposed upstream from the first porous plate.

7. A device according to claim 4, wherein the spacer is disposed directly against the first perforated plate and the first porous plate is disposed upstream from the spacer.

8. A device according to claim 1 or claim 2, wherein the upstream web of the limiter defines on its downstream face a spacer annulus which co-operates with the downstream web of the limiter to hold the second porous plate without clearance pressed against the third perforated plate of the downstream web.

9. A device according to claim 1 or claim 2, wherein an empty space is provided between the second perforated plate and the second porous plate and has, in the axial direction, a thickness that is about twice the diameter d of the calibrated holes in the second perforated plate of the upstream web.

10. A device according to claim 1 or claim 2, wherein the straightener has thickness in the axial direction that is about one-third the nominal diameter D of the pipe.

11. A device according to claim 1 or claim 2, wherein the limiter has thickness in the axial direction of about one-third the nominal diameter D of the pipe.

12. A device according to claim 1 or claim 2, wherein the first and second porous plates are of a thickness lying in the range 5 mm to 20 mm, and preferably in the vicinity of 10 mm.

13. A device according to claim 1 or claim 2, wherein the first and second porous plates are constituted by a highly aerated nickel-chromium foam of density of about 0.6 g/cm3, in which the ratio of solid volume over total volume is of the order of 6%.

14. A device according to claim 1 or claim 2, wherein the number n of calibrated holes in the second perforated plate is determined to be close to the value of the ratio Q/q between the overall flow coefficient Q of the limiter which is less than or equal to the nominal flow rate of the flowmeter and the flow coefficient q of a calibrated hole, which is given by the formula:

$$q = KS T_c P_o / 2 p_o T_o$$

where S is the section of a calibrated hole, K is a coefficient which depends on the shape of the hole, Tc is the temperature upstream from the limiter, and Po, To, and ro are normal conditions of pressure, temperature, and density for the gas under consideration.

15. A device according to claim 1 or claim 2, wherein the holes of the first perforated plate have a diameter lying in the range 1/30th to 1/8th of the nominal diameter of the pipe.

16. A device according to claim 1 or claim 2, wherein the second perforated plate of the upstream web has 8 to 100 calibrated holes distributed in uniform manner over three to six concentric rings.

17. A device according to claim 1, wherein the third perforated plate of the downstream web has 20 to 40 holes distributed in uniform manner over two to four concentric rings.

18. A device according to claim 17, wherein the holes of the third perforated plate of the downstream web present different diameters.

19. A device according to claim 1 or claim 2, wherein the first perforated plate comprises 25 to 335 holes distributed over four to ten concentric rings.

20. A device according to claim 1 or claim 2, wherein each of the second and third perforated plates has at least one central hole.

21. A device according to claim 1 or claim 2, wherein some of the calibrated holes of the second perforated plate are closed in selective manner by screws so as to match the overall flow coefficient Q to the rating of the flowmeter as a function of the density of the gas.

22. A device according to claim 1 or claim 2, wherein the first perforated plate perforated with holes is constituted by a central portion of an upstream web whose peripheral portion defines firstly the spacer and secondly an upstream portion of the support ring, wherein the first porous plate is held pressed by the spacer against a fourth perforated plate perforated by holes providing a total flow passage that is much greater than the total flow passage of the first perforated plate, and wherein the fourth perforated plate is constituted by a central portion of a downstream web whose peripheral portion defines a downstream portion of the support ring.

23. A device according to claim 2, wherein the support ring has, in the vicinity of its downstream face, a shoulder projecting radially inwards from the support ring, and wherein the first perforated plate is placed directly in contact with said shoulder.

24. A device according to claim 23, wherein the first perforated plate, the first porous plate, and the spacer constitute a stack coming into abutment against the shoulder of the support ring, and wherein the sum of the thicknesses in the axial direction of the first perforated plate, of the first porous plate, and of the spacer is slightly greater than the distance in the axial direction between the downstream shoulder of the support ring and the upstream face of the said support right in such a manner that clamping the stack between the flange of the upstream connection pipe and the upstream flange of the flowmeter compresses the first porous plate to a small extent.

25. A device according to claim 23, wherein the first porous plate is disposed directly against the first perforated plate and the spacer in the form of an annulus is disposed upstream from the first porous plate.

26. A device according to claim 23, wherein the spacer is disposed directly against the first perforated plate and the first porous plate is disposed upstream from the spacer.

27. A device according to claim 1, wherein the third perforated plate of the downstream web has 20 to 40 holes distributed in uniform manner over two to four concentric rings.

28. A device according to claim 27, wherein the holes of the third perforated plate of he downstream web present different diameters.

* * * * *